United States Patent
Molin et al.

(10) Patent No.: US 9,041,370 B2
(45) Date of Patent: *May 26, 2015

(54) CHARGE PUMP REGULATOR CIRCUIT WITH A VARIABLE DRIVE VOLTAGE RING OSCILLATOR

(75) Inventors: Stuart B. Molin, Carlsbad, CA (US); Perry Lou, Carlsbad, CA (US); Clint Kemerling, Escondido, CA (US)

(73) Assignee: Silanna Semiconductor U.S.A., Inc., San Diego, CA (US)

( * ) Notice: Subject to any disclaimer, the term of this patent is extended or adjusted under 35 U.S.C. 154(b) by 193 days.

This patent is subject to a terminal disclaimer.

(21) Appl. No.: 13/544,815

(22) Filed: Jul. 9, 2012

(65) Prior Publication Data

US 2014/0009135 A1    Jan. 9, 2014

(51) Int. Cl.
    *G05F 1/00*       (2006.01)
    *H02M 3/07*    (2006.01)

(52) U.S. Cl.
    CPC ........................................ *H02M 3/07* (2013.01)

(58) Field of Classification Search
    CPC ......................................................... H02M 3/07
    USPC ......................................................... 323/293
    See application file for complete search history.

(56) References Cited

U.S. PATENT DOCUMENTS

| | | | |
|---|---|---|---|
| 4,656,369 A * | 4/1987 | Lou | ................................ 327/536 |
| 5,003,197 A | 3/1991 | Nojima et al. | |
| 5,301,097 A | 4/1994 | Mcdaniel | |
| 5,394,372 A | 2/1995 | Tanaka et al. | |
| 6,121,821 A * | 9/2000 | Miki | .............................. 327/536 |
| 6,194,971 B1 | 2/2001 | Glen et al. | |
| 6,294,950 B1 | 9/2001 | Lee et al. | |
| 6,304,469 B1 | 10/2001 | Liu | |
| 6,469,569 B1 | 10/2002 | Miyamitsu | |
| 6,490,220 B1 | 12/2002 | Merritt et al. | |

(Continued)

FOREIGN PATENT DOCUMENTS

| KR | 0132023 B1 | 4/1998 |
|---|---|---|
| KR | 100586545 B1 | 6/2006 |

(Continued)

OTHER PUBLICATIONS

Notice of Allowance and Fees dated Jun. 4, 2013 for U.S. Appl. No. 13/720,589.

(Continued)

*Primary Examiner* — Emily P Pham
(74) *Attorney, Agent, or Firm* — The Mueller Law Office, P.C.

(57) ABSTRACT

A charge pump regulator circuit includes a voltage controlled oscillator and a plurality of charge pumps. The voltage controlled oscillator has a plurality of inverter stages connected in series in a ring. A plurality of oscillating signals is generated from outputs of the inverter stages. Each oscillating signal has a frequency or amplitude or both that are variable dependent on a variable drive voltage. Each oscillating signal is phase shifted from a preceding oscillating signal. Each charge pump is connected to a corresponding one of the inverter stages to receive the oscillating signal produced by that inverter stage. Each charge pump outputs a voltage and current. The output of each charge pump is phase shifted from the outputs of other charge pumps. A combination of the currents thus produced is provided at about a voltage level to the load.

21 Claims, 4 Drawing Sheets

(56) References Cited

U.S. PATENT DOCUMENTS

| | | | |
|---|---|---|---|
| 6,597,235 B2 | 7/2003 | Choi | |
| 6,657,503 B2 | 12/2003 | Liu | |
| 6,693,495 B1 | 2/2004 | Wang | |
| 6,838,928 B2 | 1/2005 | Mihara | |
| 7,151,413 B2 | 12/2006 | Lin | |
| 7,167,060 B2 | 1/2007 | Cho et al. | |
| 7,504,877 B1 | 3/2009 | Voogel et al. | |
| 8,111,107 B2 | 2/2012 | Huang | |
| 8,497,670 B1 * | 7/2013 | Molin et al. | 323/293 |
| 2002/0075063 A1 | 6/2002 | Hwang | |
| 2004/0097214 A1 | 5/2004 | Gard et al. | |
| 2004/0190361 A1 * | 9/2004 | Tokui et al. | 365/226 |
| 2005/0030771 A1 | 2/2005 | Conte et al. | |
| 2007/0188168 A1 | 8/2007 | Stanley et al. | |
| 2008/0054990 A1 | 3/2008 | Shieh et al. | |
| 2008/0284496 A1 | 11/2008 | Ha et al. | |
| 2008/0297231 A1 | 12/2008 | Riedel | |
| 2010/0156512 A1 | 6/2010 | Chaoui | |
| 2010/0164531 A1 | 7/2010 | Marshall et al. | |
| 2010/0201451 A1 | 8/2010 | Wu | |
| 2010/0264981 A1 * | 10/2010 | Augustyniak et al. | 327/536 |
| 2011/0037502 A1 * | 2/2011 | Nakano et al. | 327/105 |
| 2011/0148509 A1 | 6/2011 | Pan | |
| 2011/0316511 A1 | 12/2011 | Wang et al. | |
| 2012/0092054 A1 | 4/2012 | Chang et al. | |
| 2012/0230071 A1 | 9/2012 | Kaneda | |
| 2012/0242401 A1 | 9/2012 | Siragusa et al. | |

FOREIGN PATENT DOCUMENTS

| | | |
|---|---|---|
| KR | 100665006 B1 | 1/2007 |
| KR | 20100137838 A | 12/2010 |

OTHER PUBLICATIONS

International Search Report and Written Opinion dated Aug. 27, 2013 for PCT Application No. PCT/US2013/040719.

International Search Report and Written Opinion dated Oct. 22, 2013 for PCT Application No. PCT/US2013/049623.

Instruction Manual for TPS60111 Regulated 5-V 150-mA Low-Noise Charge PUmp DC/DC Converted, Texas Instruments Inc., Jun. 1999-Jun. 2008, Dallas Texas.

Office Action dated Feb. 27, 2014 for U.S. Appl. No. 13/937,201.

Office Action dated Aug. 15, 2014 for U.S. Appl. No. 13/937,201.

Office Action dated Dec. 16, 2014 for U.S. Appl. No. 13/937,201.

Notice of Allowance and Fees dated Mar. 16, 2015 for U.S. Appl. No. 13/937,201.

* cited by examiner

CHARGE PUMP REGULATOR CIRCUIT WITH A VARIABLE DRIVE VOLTAGE RING OSCILLATOR

BACKGROUND OF THE INVENTION

Charge pump regulator circuits may be used to generate an output voltage and current to power a load circuit in an electronic device. There are different types of charge pump regulator circuits, each having different strengths and weaknesses. A common feature of such charge pump regulator circuits is an oscillating signal that is used to generate the output voltage and current. A generally undesirable result of the use of such an oscillating signal is the presence of noise, i.e. ripple or jitter, in the output current and/or voltage of the charge pump regulator circuit, even after passing the output signal through an appropriate filter. Most load circuits, though, can tolerate a certain amount of noise. Nevertheless, various trends in the development of new electronic devices make it a necessity to continually strive for lower and lower levels of noise in such regulator circuits.

Figure 1:
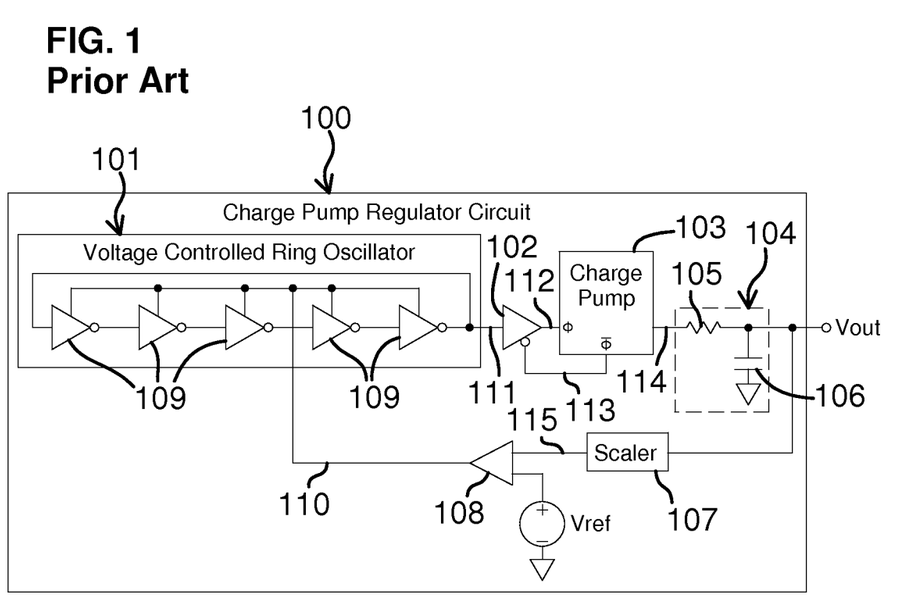
FIG. 1 is a simplified schematic diagram of a prior art charge pump circuit.

A prior art example of a charge pump regulator circuit 100 is shown in FIG. 1. The charge pump regulator circuit 100 generally includes a voltage controlled ring oscillator 101, a high gain buffer 102, a charge pump (a.k.a. voltage multiplier or voltage adder) 103, an RC filter 104 (resistor 105 and capacitor 106), a scaler 107 and an operational amplifier (op-amp) 108. The oscillator 101 generally includes a plurality of inverter stages 109 connected in series output-to-input in a ring. (Some other components or connections are implied, but not shown for simplicity.)

The inverter stages 109 receive a drive voltage (e.g. Vdd) at 110 from the output of the op-amp 108. Under the control of the drive voltage, the signal inverting action of the inverter stages 109 generates an oscillating signal at 111, e.g. the output of the one of the inverter stages 109 in the ring. A frequency and amplitude of the oscillating signal at 111 generally depends on a voltage level of the drive voltage.

The oscillating signal at 111 is supplied to an input of the buffer 102. The buffer 102 generates a positive oscillating signal at 112 and a negative oscillating signal at 113. The positive and negative oscillating signals at 112 and 113 generally have the same frequency as the oscillating signal at 111. However, the buffer 102 generally drives an amplitude of the positive and negative oscillating signals at 112 and 113 from rail to rail, i.e. between the same minimum and maximum levels, regardless of the amplitude of the oscillating signal at 111.

The positive and negative oscillating signals at 112 and 113 are supplied to a positive phase input Φ and a negative phase input $\overline{\Phi}$, respectively, of the charge pump 103. The charge pump 103 generally includes a plurality of series-connected charge pump stages (not shown), which use the positive and negative oscillating signals at 112 and 113 to add voltage to (or subtract from) an initial voltage (not shown) to produce an output current and voltage at 114. The output at 114 of the charge pump 103 is passed through the filter 104 to smooth it out to produce the charge pump regulator circuit output voltage Vout. The output voltage Vout is provided to a load circuit (not shown) of the overall electronic device of which the charge pump regulator circuit 100 is a part.

The output voltage Vout is also provided through the scaler 107 to the op-amp 108 in a feedback loop that controls the current and voltage levels of the output voltage Vout. The scaler 107 produces a scaled voltage at 115 from the output voltage Vout. The scaled voltage is provided to the op-amp 108 along with a reference voltage Vref. The op-amp 108 produces the drive voltage at 110 for the inverter stages 109 based on the scaled voltage at 115 and the reference voltage Vref.

If the scaled voltage at 115 is too large relative to the reference voltage Vref, i.e. the output voltage Vout has increased too much, then the op-amp 108 decreases the drive voltage at 110. When the drive voltage at 110 decreases, the frequency of the oscillating signal at 111 produced by the inverter stages 109 of the oscillator 101 decreases, thereby reducing the frequency of the positive and negative oscillating signals at 112 and 113. When the frequency of the positive and negative oscillating signals at 112 and 113 is reduced, the voltage output at 114 by the charge pump 103 is reduced, thereby reversing the increase in the output voltage Vout. Similarly, if the output voltage Vout decreases too much, then the opposite effect occurs to reverse the decrease. In this manner, the output voltage Vout is generally maintained at about a desired voltage level within an acceptable tolerance or range of ripple or noise.

SUMMARY

A charge pump regulator circuit includes a voltage controlled oscillator and a plurality of charge pumps. The voltage controlled oscillator has a plurality of inverter stages connected in series in a ring. A plurality of oscillating signals is generated from outputs of the inverter stages. Each oscillating signal has a frequency and amplitude that are variable dependent on a variable drive voltage. Each oscillating signal is phase shifted from a preceding oscillating signal. Each charge pump is connected to a corresponding one of the inverter stages to receive the oscillating signal produced by that inverter stage. Each charge pump outputs a voltage and current. A combination of the currents thus produced is provided at about a voltage level to the load.

A more complete appreciation of the present disclosure and its scope, and the manner in which it achieves the above noted improvements, can be obtained by reference to the following detailed description of presently preferred embodiments taken in connection with the accompanying drawings, which are briefly summarized below, and the appended claims.

DETAILED DESCRIPTION OF THE INVENTION

According to some embodiments, the present invention achieves an improved low noise output voltage (at least under some operating conditions) with a charge pump regulator circuit that has a voltage controlled oscillator and a plurality of charge pumps. The voltage controlled oscillator has a plurality of inverter stages connected in series in a ring. Each inverter stage produces an oscillating signal that is provided to a next one of the inverter stages. Each oscillating signal has a frequency and amplitude that are variable dependent on a variable drive voltage. (Alternatively, either the frequency or the amplitude, but not both, is variable.) Each charge pump is connected to a corresponding one of the inverter stages to receive the oscillating signal produced by that inverter stage. The charge pumps output a current at about a voltage level to a load.

According to some other embodiments, the present invention achieves an improved low noise output voltage (at least under some operating conditions) with a charge pump regulator circuit that has a voltage controlled oscillator and a plurality of charge pumps. The voltage controlled oscillator includes a plurality of inverter stages connected in series in a ring. Each inverter stage produces an oscillating signal that is provided to a next one of the inverter stages. Each oscillating signal is phase shifted from a preceding oscillating signal. The charge pumps are arranged in parallel. Each charge pump is connected to a corresponding one of the inverter stages to receive the oscillating signal produced by that inverter stage. An output of each charge pump is phase shifted from the outputs of other charge pumps. A combination of the currents thus produced is provided at about a voltage level to a load.

In accordance with some other embodiments, the present invention achieves an improved low noise output voltage (at least under some operating conditions) with a method that involves generating a plurality of oscillating signals from outputs of inverter stages of a voltage controlled oscillator having a plurality of inverter stages connected in series in a ring. A frequency and/or amplitude of the oscillating signals is varied depending on a variable drive voltage applied to the inverter stages. The oscillating signals are provided as inputs to a plurality of charge pumps. A plurality of charge pump currents are generated at a voltage level from the oscillating signals. A combination of the charge pump currents is provided at the voltage level to a load.

Figure 2:
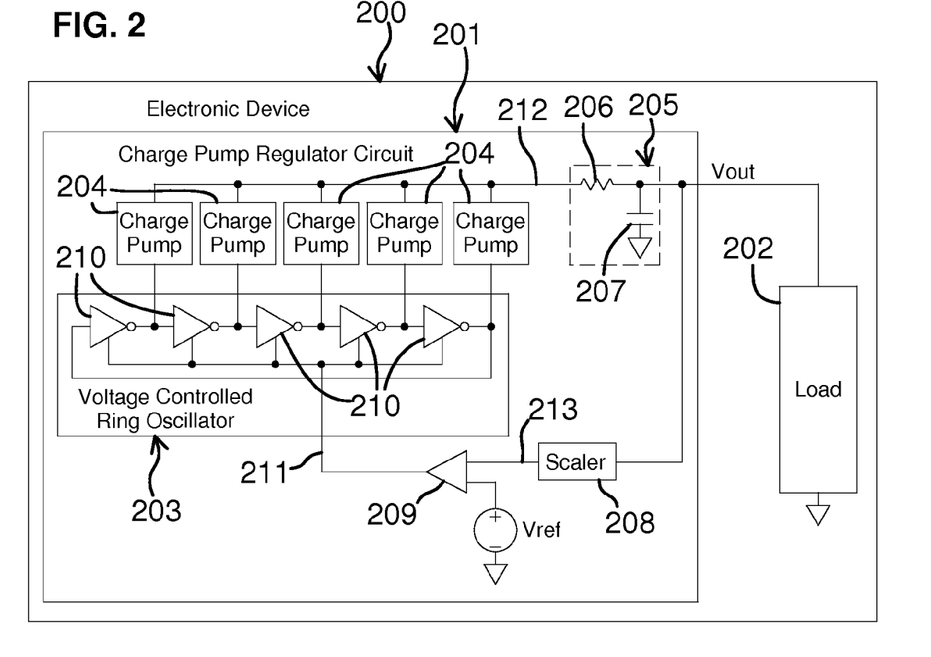
FIG. 2 is a simplified schematic diagram of an electronic device with a charge pump circuit incorporating an embodiment of the present invention.

An electronic device 200 incorporating an embodiment of the present invention is shown in FIG. 2. The electronic device 200 generally includes one or more charge pump regulator circuits 201 that provide power to a load circuit 202. As such, the electronic device 200 may be any appropriate electronic device, such as a computer, a phone, a game console, a clock, an automobile control system or a networking device, among many others.

The charge pump regulator circuit 201 produces power at a generally constant voltage level with a variable current, depending on the activity of the load circuit 202. The design of the charge pump regulator circuit 201 described below generally enables a relatively low level of noise in its output, particularly at lower power production levels, where noise can have a greater negative affect on the load circuit 202 in some situations. For example, in an embodiment in which the electronic device 200 is a cell phone (or other similar device), the received signal strength can be low in power. In this situation the noise coupled to the load circuit 202 from the charge pump regulator circuit 201 can interfere with the received signal, thereby degrading the radio link. Therefore, it is generally desirable to have relatively low noise under such operating conditions. The present invention may also be used in many other situations.

The charge pump regulator circuit 201 generally includes a voltage controlled ring oscillator 203, a plurality of charge pumps (a.k.a. voltage multipliers or voltage adders) 204, a filter 205 (e.g. resistor 206 and capacitor 207), a scaler 208 and an op-amp 209. The voltage controlled ring oscillator 203 generally includes a plurality of inverter stages 210 connected output-to-input in series in a ring. Each charge pump 204 corresponds to one of the inverter stages 210.

The charge pump regulator circuit 201 generally does not require the high gain buffer 102 (FIG. 1) to provide the input to the charge pumps 204. Additionally, although the charge pump regulator circuit 201 includes more charge pumps 204 than does the prior art circuit 100, and although each charge pump 204 may have a similar geometry to that of the prior art charge pump 103, each charge pump 204 may have a physical size that is scaled down from that of the prior art charge pump 103 by a factor roughly equal to the number of the charge pumps 204. Therefore, the charge pump regulator circuit 201 may have a physical size that is comparable to, or even smaller than, that of the prior art circuit 100. Additionally, the energy used to power the multiple charge pumps 204 may be roughly comparable to that used to power the prior art charge pump 103 at similar power output levels.

The inverter stages 210 are shown as simple inverters that output an inverted version of their input signal. (Alternatively, the inverter stages 210 may include additional components that produce both an inverted and non-inverted version of their input signal. Other forms of voltage controlled ring oscillators may also be acceptable.) Under power from a drive voltage received from the op-amp 209 at 211, the response of the inverter stages 210 is to generate an oscillating signal (or series pulses) that propagates through each inverter stage 210 around in a ring. Each inverter stage 210, thus, produces approximately the same oscillating signal, except that each oscillating signal in the ring is inverted and phase shifted from the preceding oscillating signal. (The phase shifting is described below with respect to FIG. 4.) The phase shift is generally due to a response delay within each inverter stage 210. A frequency and amplitude of each oscillating signal and a duration of the delay that produces the phase shift are generally dependent on the voltage level of the drive voltage at 211 received from the op-amp 209. The oscillating signals are provided, not only to the next inverter stage 210 in the ring, but also to the charge pumps 204. Each inverter stage 210, thus, corresponds to one of the charge pumps 204.

The charge pumps 204 may be any appropriate circuitry that may add or multiply voltage based on the frequency and amplitude of the oscillating signals received from the inverter stages 210. (An example circuit for the charge pumps 204 is described below with respect to FIG. 3. Other types of circuits for the charge pumps 204 are also possible.) The charge pumps 204 are generally arranged in parallel, with inputs connected to the outputs of the corresponding inverter stages 210 and outputs connected together to form a combined output at 212.

In some embodiments, each of the charge pumps 204 generally produces approximately the same current and voltage based on the frequency and amplitude of the oscillating signals and a relatively constant input voltage (not shown). The output current and voltage of each charge pump 204 contains some noise, ripple or jitter. The noise is at least partially caused by the oscillation of the oscillating signals. Since the multiple charge pumps 204 are each considerably smaller than the single prior art charge pump 103 (FIG. 1), however, the noise produced by each charge pump 204 is considerably smaller than the noise produced by the prior art charge pump 103 when producing a comparable amount of power. Additionally, since the oscillating signals are phase shifted from each other, the outputs of the charge pumps 204 are similarly phase shifted. Consequently, since the level of the noise is typically largest within the same portion of each cycle of the output, and since the outputs are phase shifted from each other, the portions of maximum noise within each output generally do not overlap much, if at all. The already relatively low noise level in the outputs of each individual charge pump 204 is, therefore, generally spread out across the overall combined output of the charge pumps 204. The noise from the output of one charge pump 204, therefore, generally does not exacerbate the noise from the outputs of the other charge pumps 204.

There are prior art charge pump regulator circuits that incorporate multiple charge pumps in parallel with out-of-phase outputs. However, when such circuits also use a ring oscillator to generate the oscillating signals for the charge pumps, additional circuit components are used to generate the out-of-phase oscillating signals used for each charge pump. The circuit complexity, size and cost are, thereby increased due to the additional circuit components. Embodiments of the present invention, however, generally reduce the complexity of the circuitry that supplies the oscillating signals to the charge pumps 204 (e.g. eliminating the high gain buffer 102 of FIG. 1) and take the unconventional approach of tapping intermediate locations with the ring of inverter stages 210 to generate the phase-shifted oscillating signals without additional circuit components.

In addition to the frequency, the amplitude of the oscillating signals that drive the charge pumps 204 is variable, unlike the amplitude of the oscillating signal supplied to the prior art charge pump 103 (FIG. 1) from the high gain buffer 102. In the prior art situation, the high gain buffer 102 generally drives its output rail-to-rail, i.e. between the same maximum and minimum all the time, in order to properly drive the relatively larger prior art charge pump 103. The variability of both the amplitude and frequency of the oscillating signals for the charge pumps 204, however, generally enables a greater dynamic range for the outputs of the charge pumps 204 than that of the prior art charge pump 103.

Both the amplitude and the frequency of the oscillating signals, however, contribute to the level of noise in the outputs of the charge pumps 204. Therefore, when the amplitude of the oscillating signals for the charge pumps 204 is reduced, the level of noise in the outputs of the charge pumps 204 is also reduced. A reduced amplitude for the oscillating signals generally corresponds with a low power output for the overall charge pump regulator circuit 201. Additionally, the reduced amplitude is generally combined with a reduced frequency, or increased cycle period, for the oscillating signals, which further aids in the reduction of noise at low power output. (The relationship between the amplitude and the frequency/period is described below with respect to FIGS. 5 and 6.) When the power output is increased, the noise level may increase along with the amplitude and frequency of the oscillating signals, but generally remains relatively low compared to that of the prior art charge pump regulator circuit 100 at similar power levels. Additionally, many types of load circuits 202 can tolerate a greater amount of noise during higher power operations than at lower power operations. Therefore, the charge pump regulator circuit 201 may be ideally suited for use in designs that require lower noise at lower power consumption operations, such as, but not limited to, wireless communication receivers, as described above.

The combined output at 212 of the charge pumps 204 is passed through the filter 205 to further smooth out the output voltage Vout of the overall charge pump regulator circuit 201. The output voltage Vout is supplied to the load circuit 202 to power at least some of the functions of the electronic device 200. These functions may vary or be turned on and off at different times, so the load placed on the charge pump regulator circuit 201 may vary. This load variation is generally detected and compensated for by a feedback loop involving the scaler 208 and the op-amp 209.

The scaler 208 receives the output voltage Vout and scales it to a level that the op-amp 209 can handle. The op-amp 209 receives the scaled output voltage at 213 and a reference voltage Vref. Based on the scaled output voltage at 213 and the reference voltage Vref, the op-amp 209 produces the drive voltage at 211 for the inverter stages 210. Generally, when the load driven by the output voltage Vout increases, the output voltage Vout is pulled down, causing the scaled output voltage at 213 to decrease relative to the reference voltage Vref, which causes the op-amp 209 to increase the drive voltage at 211, which causes the inverter stages 210 to increase the frequency and amplitude of the oscillating signals, which causes the charge pumps 204 to increase their output, which increases the output voltage and current and brings the output voltage Vout back to the desired level. Conversely, when the load driven by the output voltage Vout decreases, the output voltage Vout increases, causing the scaled output voltage at 213 to increase relative to the reference voltage Vref, which causes the op-amp 209 to decrease the drive voltage at 211, which causes the inverter stages 210 to decrease the frequency and amplitude of the oscillating signals, which causes the charge pumps 204 to decrease their output, which decreases the output voltage and current and brings the output voltage Vout back to the desired level.

Figure 3:
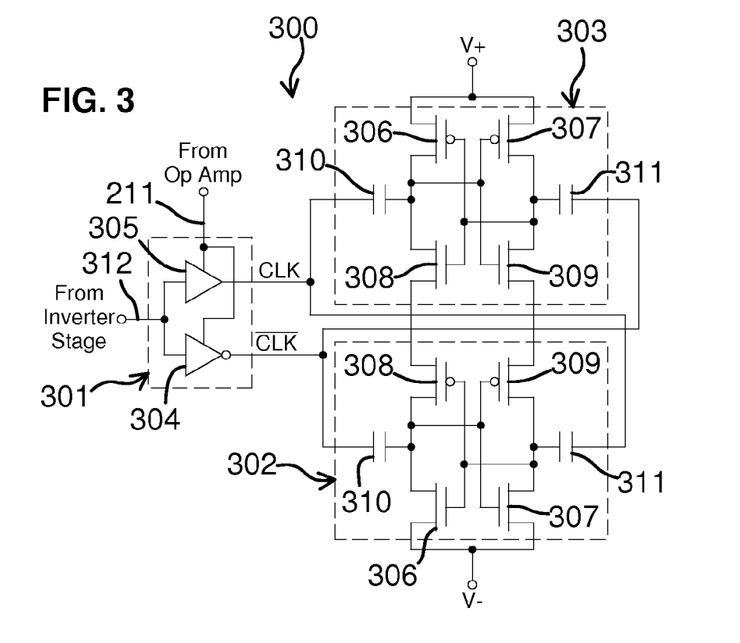
FIG. 3 is a simplified schematic diagram of an example charge pump for use in the charge pump circuit shown in FIG. 2 according to an embodiment of the present invention.

An example charge pump (a.k.a. voltage multiplier or voltage adder) 300 that may be used as the charge pumps 204 is shown in FIG. 3. The charge pump 300 is shown and described for illustrative purposes only. Other types of charge pumps may also be used for the charge pumps 204, so it is understood that the present invention is not limited to this design, except if and where expressly stated.

The example charge pump 300 generally includes an oscillating signal splitter 301 and two charge pump stages (or cells) 302 and 303. The oscillating signal splitter 301 generally includes an inverter 304 and a delay buffer 305. The charge pump stages 302 and 303 generally include transistors 306, 307, 308 and 309 and capacitors 310 and 311.

The oscillating signal splitter 301 generally converts or splits the oscillating signal received from the corresponding inverter stage 210 (FIG. 2) at 312 into a positive oscillating signal CLK and a negative oscillating signal $\overline{CLK}$. The inverter 304 generates the negative oscillating signal $\overline{CLK}$ by inverting the incoming oscillating signal at 312. The delay buffer 305 generates the positive oscillating signal CLK by delaying the incoming oscillating signal at 312 by approximately the same amount as the delay in the inverter 304, so the positive and negative oscillating signals CLK and $\overline{CLK}$ are approximately matched. Depending on the embodiment, though, the positive and negative oscillating signals CLK and $\overline{CLK}$ do not necessarily have to be exact inversions of each other.

In some embodiments, the inverter 304 and the delay buffer 305 are preferably driven by the same drive voltage at 211 (FIG. 2) from the op-amp 209 that drives the inverter stages 210. Additionally, the inverter 304 and the delay buffer 305 preferably have a similar construction as the inverter stages 210. As a result, the frequency and amplitude of the oscillating signals produced by the inverter stages 210 are preserved within the positive and negative oscillating signals CLK and $\overline{CLK}$ when they pass through the inverter 304 and the delay buffer 305.

In some alternative embodiments, the inverter stages 210 produce the oscillating signals in such a manner that either the frequency or amplitude is variable, but not both. In this case, either the charge pumps 204 or 300 may operate with only one of these parameters being variable, or the oscillating signals may pass through other components (e.g. the inverter 304 and the delay buffer 305) that produce both the frequency and amplitude as variable.

In some alternative embodiments, the inverter stages 210 (FIG. 2) produce both the positive and negative oscillating signals CLK and $\overline{\text{CLK}}$ and supply them to the charge pumps 204. In this case, the oscillating signal splitter 301 is not needed within the charge pump 300.

The charge pump stages 302 and 303 are connected in series between a positive voltage node V+ and negative voltage node V−. The charge pump stages 302 and 303 use the positive and negative oscillating signals CLK and $\overline{\text{CLK}}$ to step up or step down (i.e. voltage add/subtract or voltage multiply) from an initial input voltage (or ground) to produce the output current and voltage at 212 (FIG. 2) in a conventional manner.

In embodiments in which it is desired for the output voltage to be stepped up from the initial input voltage (or ground), the initial input voltage (or ground) is connected to the negative voltage node V−, and the output at 212 is connected to the positive voltage node V+. Each charge pump stage 302 and 302 then steps up the voltage from the initial input voltage (or ground) at the negative voltage node V− by an amount based on the frequency and amplitude of the positive and negative oscillating signals CLK and $\overline{\text{CLK}}$ to produce the output voltage at the positive voltage node V+.

On the other hand, in embodiments in which it is desired for the output voltage to be stepped down from the initial input voltage (or ground), the initial input voltage (or ground) is connected to the positive voltage node V+, and the output at 212 is connected to the negative voltage node V−. Each charge pump stage 302 and 302 then steps down the voltage from the initial input voltage (or ground) at the positive voltage node V+ by an amount based on the frequency and amplitude of the positive and negative oscillating signals CLK and $\overline{\text{CLK}}$ to produce the output voltage at the negative voltage node V−. (The charge pump 300, thus, sources or sinks current depending on whether the output voltage is positive or negative.)

Although the charge pump 300 is shown having two charge pump stages 302 and 303, it is understood that the present invention is not necessarily so limited. Instead, any number of charge pump stages may be used, generally depending on the level of the initial input voltage, the amount that each charge pump stage steps up/down the voltage and the desired level for the output voltage.

Additionally, although the charge pump 300 is shown operating based on the positive and negative oscillating signals CLK and $\overline{\text{CLK}}$, it is understood that the present invention is not necessarily so limited. Instead, other types of charge pumps may be used, including those that operate with a single oscillating signal.

Figure 4:
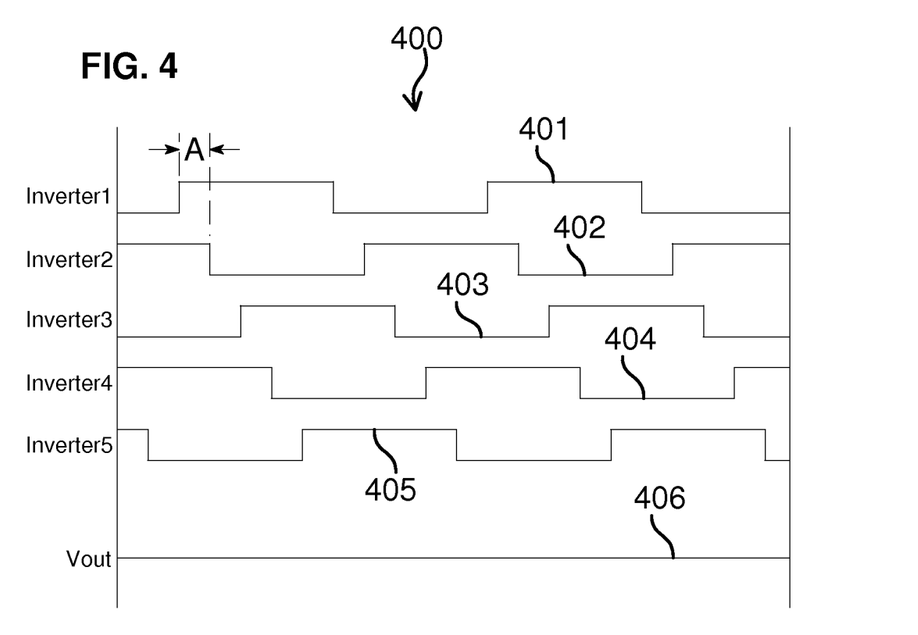
FIG. 4 shows simplified example timing diagrams illustrating the performance of example inverter stages and an output of the charge pump circuit shown in FIG. 2 according to an embodiment of the present invention.

A timing diagram 400 illustrating an example relationship between the oscillating signals (401-405) produced by the inverter stages 210 (FIG. 2) is shown in FIG. 4 along with an example output voltage Vout. Each oscillating signal 401-405 for each inverter stage 210 is shown inverted and phase shifted by an amount A from the one that precedes it. (The first oscillating signal 401 is likewise inverted and phase shifted from the last oscillating signal 405.) The outputs of each charge pump 204 are similarly phase shifted, so that the combined output voltage Vout (graph 406) has relatively little noise.

Figure 5:
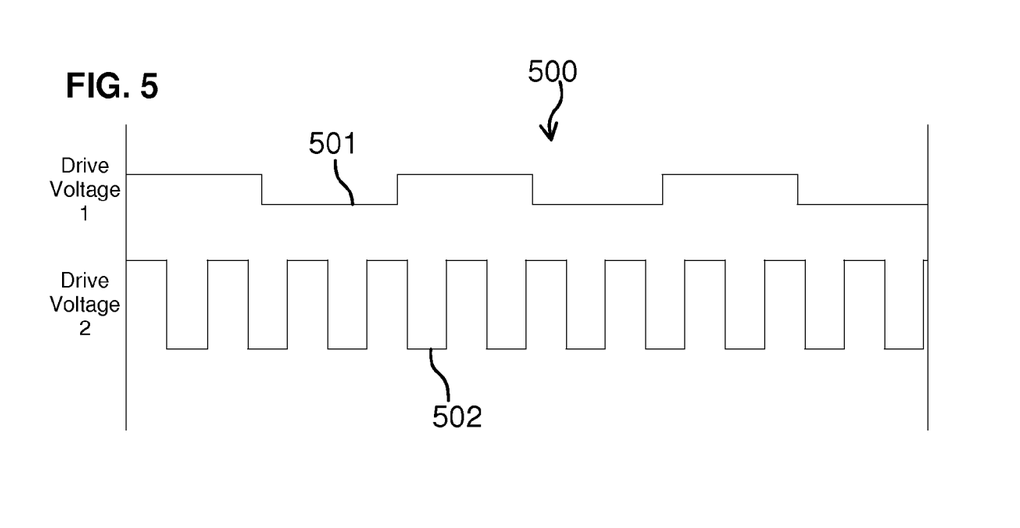
FIG. 5 shows simplified example timing diagrams illustrating the performance of an example inverter stage for use in the charge pump circuit shown in FIG. 2 according to an embodiment of the present invention.
Figure 6:
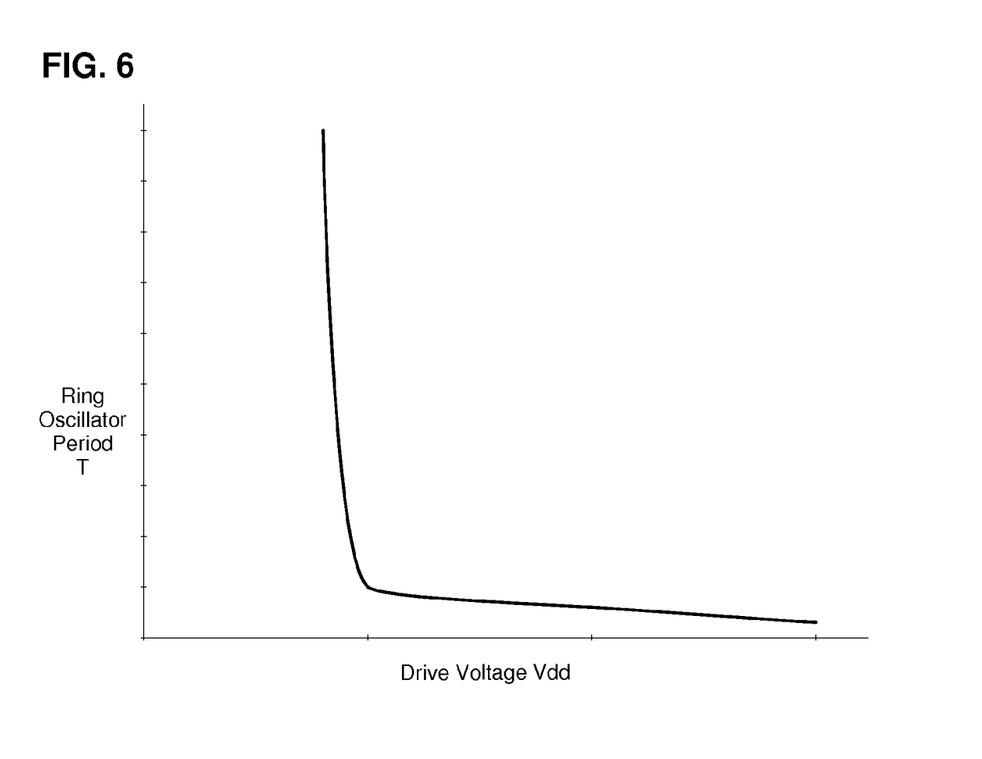
FIG. 6 is a simplified period vs. drive voltage graph illustrating the performance of an example voltage controlled ring oscillator for use in the charge pump circuit shown in FIG. 2 according to an embodiment of the present invention.

An additional timing diagram 500 illustrating the dependence of the oscillating signals on the drive voltage at 211 (FIG. 2) is shown in FIG. 5. Similarly, a ring oscillator period T vs. drive voltage Vdd response curve 600 for the inverter stages 210 is shown in FIG. 6. When the drive voltage at 211 is relatively low (graph 501, and left end of curve 600), the amplitude of the oscillating signals is relatively small and the frequency is relatively low (i.e. the period is relatively large). On the other hand, when the drive voltage at 211 is relatively high (graph 502, and right end of curve 600), the amplitude of the oscillating signals is relatively large and the frequency is relatively high (i.e. the period is relatively small). As discussed above, embodiments of the present invention take advantage of this relationship to enhance the dynamic range of the charge pump regulator circuit 201.

Although embodiments of the present invention have been discussed primarily with respect to specific embodiments thereof, other variations are possible. Various configurations of the described system may be used in place of, or in addition to, the configurations presented herein. For example, additional components may be included in circuits where appropriate. As another example, configurations were described with general reference to certain types and combinations of circuit components, but other types and/or combinations of circuit components could be used in addition to or in the place of those described.

Those skilled in the art will appreciate that the foregoing description is by way of example only, and is not intended to limit the present invention. Nothing in the disclosure should indicate that the present invention is limited to systems that have the specific type of charge pumps shown and described. Nothing in the disclosure should indicate that the present invention is limited to systems that require a particular form of semiconductor processing or integrated circuits. In general, any diagrams presented are only intended to indicate one possible configuration, and many variations are possible. Those skilled in the art will also appreciate that methods and systems consistent with the present invention are suitable for use in a wide range of applications.

While the specification has been described in detail with respect to specific embodiments of the present invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A charge pump regulator circuit that powers a variable load, the charge pump regulator circuit comprising:
   a voltage controlled oscillator comprising a plurality of inverter stages connected in series in a ring, each of the plurality of inverter stages producing an oscillating signal that is provided to a next one of the plurality of inverter stages, each oscillating signal having a frequency and amplitude that are both variable dependent on a variable drive voltage that serves as a supply voltage for the plurality of inverter stages; and
   a plurality of charge pumps, each one of the plurality of charge pumps being connected to a corresponding one of the plurality of inverter stages to receive the oscillating signal produced by that inverter stage, the plurality of charge pumps outputting a current at about a voltage level to the variable load.

2. The charge pump regulator circuit of claim 1, wherein:
each charge pump comprises a plurality of charge pump stages arranged in series; and
each oscillating signal forms a positive oscillating signal and a negative oscillating signal that are applied in an alternating manner to consecutive charge pump stages in the plurality of charge pump stages.

3. The charge pump regulator circuit of claim 1, wherein:
the voltage and current output by the plurality of charge pumps is dependent on the frequency and amplitude of the oscillating signals.

4. The charge pump regulator circuit of claim 1, wherein:
when the variable drive voltage provided to the plurality of inverter stages is reduced, the frequency and amplitude of each oscillating signal is reduced; and
when the variable drive voltage provided to the plurality of inverter stages is increased, the frequency and amplitude of each oscillating signal is are increased.

5. The charge pump regulator circuit of claim 4, wherein:
when the frequency and amplitude of each oscillating signal is reduced, a noise level in the current and voltage provided to the variable load by the plurality of charge pumps is reduced; and
when the frequency and amplitude of each oscillating signal is increased, the noise level in the current and voltage provided to the variable load by the plurality of charge pumps is increased.

6. The charge pump regulator circuit of claim 1, further comprising:
a feedback loop that generates the variable drive voltage for the plurality of inverter stages depending on feedback of the voltage level provided to the variable load.

7. The charge pump regulator circuit of claim 1, wherein:
each oscillating signal is phase shifted from a previous oscillating signal in the ring.

8. The charge pump regulator circuit of claim 7, wherein:
an output of each charge pump is phase shifted from the output of other charge pumps.

9. The charge pump regulator circuit of claim 1, wherein:
the plurality of charge pumps are arranged in parallel.

10. A charge pump regulator circuit that powers a variable load, the circuit comprising:
a voltage controlled oscillator comprising a plurality of inverter stages connected in series in a ring, each of the plurality of inverter stages producing a phase shifted oscillating signal that is provided to a next inverter stage in the plurality of inverter stages, and each phase shifted oscillating signal having a frequency and amplitude that are both variable dependent on a variable drive voltage that serves as a supply voltage for the plurality of inverter stages; and
a plurality of charge pumps arranged in parallel, each charge pump being connected to a corresponding inverter stage in the plurality of inverter stages to receive the phase shifted oscillating signal produced by the corresponding inverter stage, each charge pump outputting a voltage and a current, the output of each charge pump being phase shifted, the current from each charge pump being combined and provided at about a voltage level to the variable load.

11. The charge pump regulator circuit of claim 10, wherein:
each charge pump comprises a plurality of charge pump stages arranged in series; and
each oscillating signal forms a positive oscillating signal and a negative oscillating signal that are applied in an alternating manner to consecutive charge pump stages in the plurality of charge pump stages.

12. The charge pump regulator circuit of claim 10, further comprising:
a feedback loop that provides a drive voltage that powers the plurality of inverter stages, a change in the drive voltage causing the plurality of inverter stages to change a frequency or an amplitude of each phase shifted oscillating signal, which causes a change in a level of the voltage and current provided to the variable load by the plurality of charge pumps while attempting to maintain the voltage level thereof.

13. The charge pump regulator circuit of claim 12, wherein:
when the frequency and amplitude of the oscillating signals are reduced, a noise level in the current and voltage provided to the variable load by the plurality of charge pumps is reduced; and
when the frequency and amplitude of the oscillating signals are increased, the noise level in the current and voltage provided to the variable load by the plurality of charge pumps is increased.

14. The charge pump regulator circuit of claim 12, wherein:
when the drive voltage provided to the plurality of inverter stages is reduced, the frequency and amplitude of each phase shifted oscillating signal is reduced; and
when the drive voltage provided to the plurality of inverter stages is increased, the frequency and amplitude of each phase shifted oscillating signal is increased.

15. A method comprising:
generating a plurality of oscillating signals from a voltage controlled oscillator having a plurality of inverter stages connected in series in a ring;
varying a frequency and an amplitude of the plurality of oscillating signals depending on a variable drive voltage that serves as a supply voltage for the plurality of inverter stages;
providing the plurality of oscillating signals as inputs to a plurality of charge pumps;
generating a plurality of charge pump output voltages and currents; and
providing a combination of the plurality of charge pump output currents at a voltage level to a load.

16. The method of claim 15, wherein:
each oscillating signal is phase shifted from a previous one of the plurality of oscillating signals in the ring;
the plurality of charge pumps are arranged in parallel;
each charge pump corresponds to one of the plurality of inverter stages; and
an output of each charge pump is phase shifted from the output of each other charge pump.

17. The method of claim 15, further comprising:
varying both the frequency and the amplitude of the plurality of oscillating signals depending on the variable drive voltage applied to the plurality of inverter stages.

18. The method of claim 17, further comprising:
regulating the plurality of oscillating signals to regulate the plurality of charge pump output currents provided at about the voltage level in order to respond to variations in the load.

19. The method of claim 18, further comprising:
regulating the plurality of oscillating signals with a feedback loop that produces the variable drive voltage for powering the plurality of inverter stages.

20. The method of claim 19, further comprising:
regulating the plurality of oscillating signals to reduce the frequency and amplitude thereof when the variable drive voltage is reduced; and
regulating the plurality of oscillating signals to increase the frequency and amplitude thereof when the variable drive voltage is increased.

21. The method of claim 20, further comprising:
decreasing the plurality of charge pump output voltages and currents when the frequency and amplitude of the plurality of oscillating signals are reduced; and
increasing the plurality of charge pump output voltages and currents when the frequency and amplitude of the plurality of oscillating signals are increased.

* * * * *